(12) United States Patent
Uryu et al.

(10) Patent No.: US 7,073,770 B2
(45) Date of Patent: Jul. 11, 2006

(54) ELECTROMAGNETIC VALVE

(75) Inventors: Takuya Uryu, Tokyo (JP); Yuta Ichinose, Tokyo (JP); Yoshihiko Onishi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 74 days.

(21) Appl. No.: 10/969,984

(22) Filed: Oct. 22, 2004

(65) Prior Publication Data

US 2005/0285065 A1 Dec. 29, 2005

(30) Foreign Application Priority Data

Jun. 29, 2004 (JP) .............................. 2004-191831

(51) Int. Cl.
*F16K 31/06* (2006.01)

(52) U.S. Cl. .......................... 251/129.01; 251/129.14; 251/129.18; 137/596.17

(58) Field of Classification Search ........... 251/129.14; 137/596.17

See application file for complete search history.

(56) References Cited

U.S. PATENT DOCUMENTS

| | | | | |
|---|---|---|---|---|
| 5,135,027 | A * | 8/1992 | Miki et al. ............. | 137/596.17 |
| 5,915,416 | A * | 6/1999 | Okazaki et al. ........ | 137/596.17 |
| 6,328,065 | B1 * | 12/2001 | Schmid et al. ......... | 137/596.17 |
| 6,619,616 | B1 * | 9/2003 | Sudani et al. .......... | 251/129.14 |
| 6,679,475 | B1 | 1/2004 | Rembold et al. | |
| 6,938,875 | B1 | 9/2005 | Ichinose et al. | |
| 6,953,183 | B1 | 10/2005 | Uryu et al. | |

FOREIGN PATENT DOCUMENTS

| | | |
|---|---|---|
| DE | 101 07 115 B4 | 9/2004 |
| DE | 103 53 840 A1 | 11/2004 |
| DE | 103 53 842 A1 | 11/2004 |
| JP | 2002-286152 A | 10/2002 |
| JP | 3414253 B2 | 4/2003 |

\* cited by examiner

*Primary Examiner*—J. Casimer Jacyna
(74) *Attorney, Agent, or Firm*—Sughrue Mion, PLLC

(57) ABSTRACT

Provided is an electromagnetic valve improved in terms of the sealing property of a shut-off valve with respect to a valve seat. An electromagnetic valve according to the present invention includes: a housing (10) having an inflow hole (11) and a discharge hole (13); a valve seat (15) secured in position inside the housing (10); a shut-off valve (16) adapted to come into contact with one surface of the valve seat (15) to shut off a working fluid flowing into the housing (10) through the inflow hole (11); a pressure regulating valve (17) provided coaxially with the axis of the shut-off valve (16) and adapted to control the amount of working fluid flowing to the exterior of the housing (10) through the discharge hole (13) by adjusting the dimension of a gap between itself and the other surface of the valve seat (15); a sleeve (18) fixed to the housing (10) and adapted to guide the shut-off valve (16) in the direction of the axis; and a guide portion (23) adapted to guide the pressure regulating valve (17) in the direction of the axis, in which the valve seat (15) is integrated with the sleeve (18) and fixed to the guide portion (23).

5 Claims, 2 Drawing Sheets

200~# ELECTROMAGNETIC VALVE

BACKGROUND OF THE INVENTION

1. Field of the Invention

The present invention relates to an electromagnetic valve to be provided, for example, in a hydraulic control circuit of an automatic transmission of an automobile.

2. Description of the Related Art

Conventionally, there has been known an electromagnetic valve in which a valve body, one end of which is guided by a plunger, moves in an axial direction, and in which a tapered surface of the valve body abuts a seat member to ensure a sealing property (see, for example, Japanese Utility Model Application Laid-open No. Hei 5-30666 (FIG. 1)).

In this construction, however, there is generated, for example, between the plunger and the valve body, an axial deviation, and there occurs one-sided abutment of the valve body against the seat member, resulting in a deterioration in sealing property.

SUMMARY OF THE INVENTION

It is an object of the present invention to solve the above problem in the prior art; it is accordingly an object of the present invention to provide an electromagnetic valve improved in terms of the sealing property of a first valve with respect to the valve seat.

An electromagnetic valve according to the present invention includes: a housing having an inflow hole through which a fluid flows in and a discharge hole through which the fluid is discharged to an exterior; a valve seat secured in position inside the housing; a first valve adapted to come into contact with one surface of the valve seat to shut off the fluid flowing into the housing through the inflow hole; a second valve provided coaxially with an axis of the first valve and adapted to control an amount of the fluid flowing to the exterior of the housing through the discharge hole by adjusting a dimension of a gap between the second valve and the other surface of the valve seat; a first valve guide portion fixed to the housing and adapted to guide the first valve in the direction of the axis; and a second valve guide portion adapted to guide the second valve in the direction of the axis, in which the valve seat is integrated with the first valve guide portion and fixed to the second valve guide portion.

In the electromagnetic valve of the present invention, it is possible to achieve an improvement in terms of the sealing property of the first valve with respect to the valve seat.

DESCRIPTION OF THE PREFERRED EMBODIMENTS

Embodiments of the present invention will now be described with reference to the drawings; the members and portions that are the same as or equivalent to each other are indicated by the same symbols.

Embodiment 1

Figure 1:
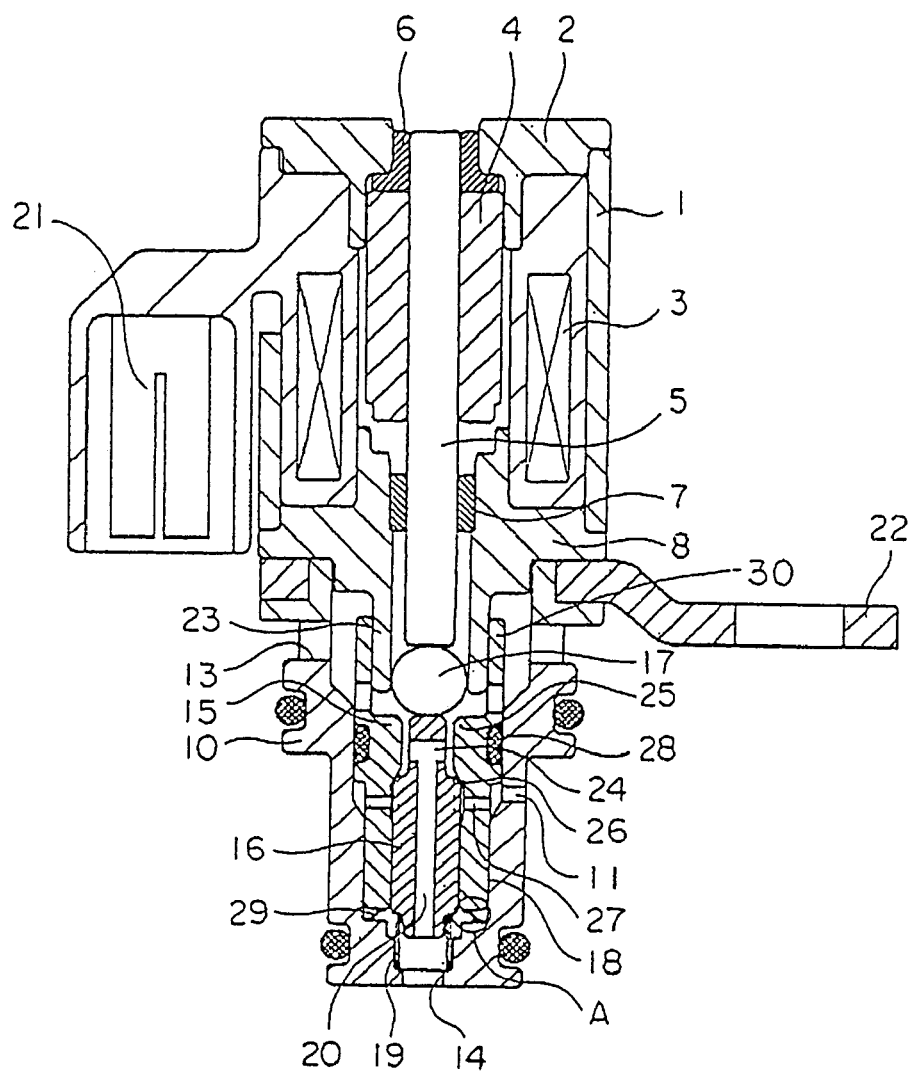
FIG. 1 is a front sectional view of a proportional electromagnetic valve for pressure control according to Embodiment 1 of the present invention.

FIG. 1 is a front sectional view of a proportional electromagnetic valve for pressure control according to Embodiment 1 of the present invention.

This proportional electromagnetic valve for pressure control (hereinafter simply referred to as the electromagnetic valve) consists of a normally-low type three-way proportional electromagnetic valve for hydraulic control in an automatic transmission.

In this electromagnetic valve, a coil 3 is provided inside a yoke 1 and a plate 2 forming a magnetic circuit. A plunger 4 is provided on the inner side of the coil 3. A rod 5 extends through this plunger 4. At the ends of the rod 5, there are provided a first slide bearing 6 and a second slide bearing 7 supporting the rod 5 so as to allow it to move in the axial direction. Fixed to the yoke 1 is a core 8 axially opposed to the plunger 4 and surrounding the rod 5.

Fixed to the lower portion of the core 8 is a housing 10 locked to a flange 22. Inside the housing 10, there are formed an inflow hole 11 through which working fluid flows in, a discharge hole 13 through which the working fluid is discharged to the exterior, and an output hole 14.

Inside the housing 10, there is provided a valve seat 15. Under the valve seat 15 and inside the housing 10, there is secured in position a cylindrical sleeve 18. The sleeve 18, which is provided with a communication hole 27, is formed integrally with the valve seat 15 as one component. Provided inside the sleeve 18 is a shut-off valve 16 serving as a first valve which is coaxial with the rod 5 and which can vertical slide relative to the sleeve 18. The shut-off valve 16 is urged toward the valve seat 15 by the elastic force of a spring 19. The shut-off valve 16 has a passage 20 extending along the center axis, and, in the upper end portion of the passage 20, there are formed a pair of holes 24 opposed to the inner wall surface of the valve seat 15.

Under the core 8, there is provided a guide portion 23 serving as a second valve guide and extending toward the shut-off valve 16. A spherical pressure regulating valve 17, guided by the guide portion 23 and serving as a second valve, is provided between the rod 5 and the shut-off valve 16.

The valve seat 15 is equipped with a cylindrical connecting portion 30 extending on the pressure regulating valve 17 side; the connecting portion 30 is fitted onto the guide portion 23, whereby the valve seat 15 is secured in position with respect to the housing 10.

Between the valve seat 15 and the housing 10, there is provided an O-ring 28 constituting a first seal member. The O-ring 28, which is annular and formed of rubber, prevents working fluid from the inflow hole 11 from leaking to the exterior along the inner wall surface of the housing 10.

Figure 2:
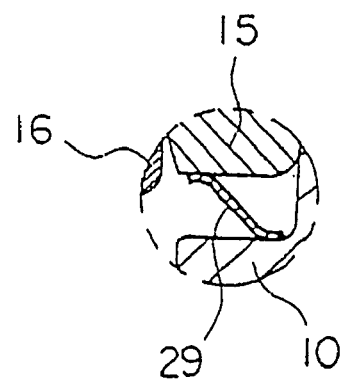
FIG. 2 is an enlarged view of portion A of FIG. 1.

Further, as shown in FIG. 2, which is an enlarged view of portion A of FIG. 1, a metal ring 29 formed of a deflected thin plate is provided in the gap between the end surface of the sleeve 18, serving as a guide portion for the first valve, and the housing 10. The metal ring 29, which constitutes a second seal member, prevents working fluid from the inflow hole 11 from leaking to the exterior along the inner wall surface of the housing 10. The metal ring 29 is formed, for example, of phosphor bronze or austenitic stainless steel, and its surface is plated with tin.

Next, the operation of this electromagnetic valve, constructed as described above, will be illustrated.

First, when the valve is not being energized, that is, when no electric current is flowing through the coil 3, the pressure regulating valve 17 is at the maximum lift position, and a shoulder portion 26 of the shut-off valve 16 is held in contact with the lower surface of the valve seat 15 by the elastic force of the spring 19. Thus, in this state, the working fluid, which is a fluid supplied into the housing 10 through the inflow hole 11, is shut off by the shut-off valve 16, and the output hole 14 and the discharge hole 13 communicate with each other through the passage 20 and the holes 24 of the shut-off valve 16, with the pressure on the output hole 14 side being equal to the pressure on the discharge hole 13 side.

When an electric current is supplied to the coil 3 through a terminal 21, a magnetic line of force is generated in the coil 3, and a magnetic flux flows through the magnetic circuit formed by the plunger 4, the plate 2, the yoke 1, and the core 8, generating a magnetic attracting force between the plunger 4 and the core 8. As a result, the plunger 4 is attracted toward the core 8, and the rod 5, which is integral with the plunger 4, moves downwards, and the pressure regulating valve 17, which is in contact with the rod 5, also moves downwards against the repulsive force from the shut-off valve 16. At this time, the magnetic attracting force from the core 8, the elastic force of the spring 19, and the fluid force applied through the output hole 14 act on the pressure regulating valve 17, which moves downwards to a position where these forces are in equilibrium with each other.

At the same time, the shut-off valve 16, which is pressurized by the pressure regulating valve 17, also moves downwards, and the shoulder portion 26 of the shut-off valve 16 is separated from the lower surface of the valve seat 15, with the result that the working fluid is guided from the inflow hole 11 to the discharge hole 13 through the communication hole 27 formed in the sleeve 18, and, at the same time, from the inflow hole 11 to the output hole 14 through the communication hole 27 and the passage 20.

The dimension of the gap between the lower surface of the valve seat 15 and the shoulder portion 26 of the shut-off valve 16 is proportional to the electric current flowing through the coil 3, and the output pressure applied through the output hole 14 is controlled linearly.

Further, when the shut-off valve 16, which is pressurized by the pressure regulating valve 17, moves downwards, the pressure regulating valve 17 abuts a shoulder portion 25 of the valve seat 15, and the working fluid is guided solely to the output hole 14 from the inflow hole 11 through the communication hole 27, the holes 24, and the passage 20.

In the electromagnetic valve of this embodiment, the valve seat 15 and the sleeve 18 constitute an integral component, and the valve seat 15 and the sleeve 18 are formed coaxially and molded simultaneously; further, since the connecting portion 30 of the valve seat 15 is fitted onto the guide portion 23 for fixation, an improvement is achieved in terms of accuracy in coaxiality between the shut-off valve 16, which slides inside the sleeve 18, and the valve seat 15, so that the sealing property of the shut-off valve 16 with respect to the valve seat 15 is improved, whereby the characteristic of the shut-off valve 16 is stabilized.

Further, in the electromagnetic valve of this embodiment, the valve seat 15 and the sleeve 18, which constitute an integral component, are fixed to the housing 10 by fitting the connecting portion 30 onto the guide portion 23, so that, as compared with an electromagnetic valve in which the sleeve is integrated with the housing by insert molding, a change in the shape of the housing 10 is facilitated, and the range of material selection can be enlarged, making it possible to achieve a reduction in cost. Thus, when, for example, the electromagnetic valve is to be introduced into an automatic transmission of different specifications, it is only necessary to change the shape of the housing.

Further, in the gap between the end surface of the sleeve 18 and the housing 10, there is provided the metal ring 29 formed of a deflected thin plate, so that, if thermal deformation is generated in the housing 10, the metal ring 29 conforms to the deformation of the housing 10 due to its elasticity, thus ensuring the sealing property of the metal ring 29.

Embodiment 2

Figure 3:
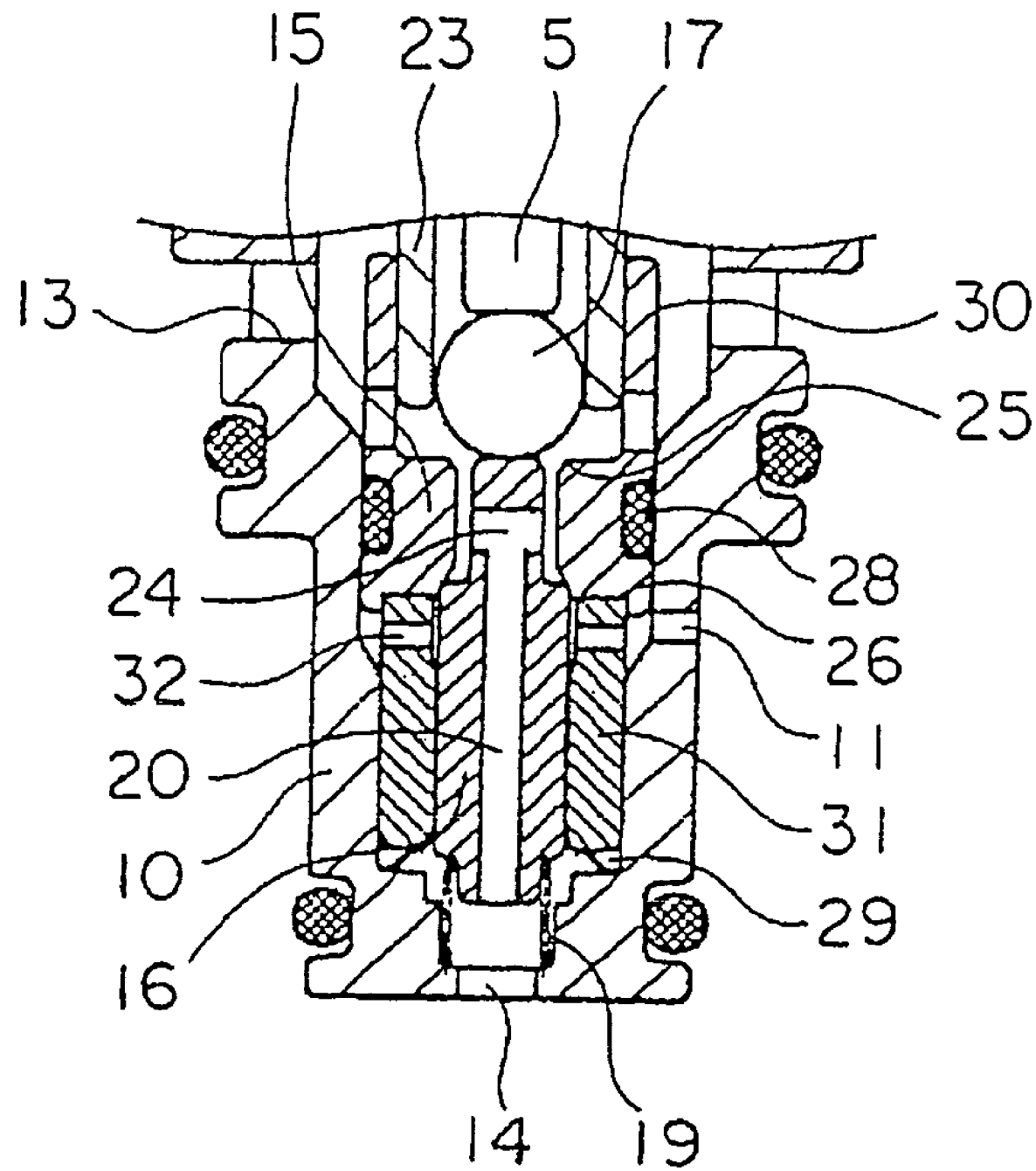
FIG. 3 is a front sectional view of a main portion of a proportional electromagnetic valve for pressure control according to Embodiment 2 of the present invention.

FIG. 3 is a front sectional view of a main portion of a proportional electromagnetic valve for pressure control according to Embodiment 2 of the present invention.

In this embodiment, a sleeve 31 with communication holes 32, which constitutes the guide portion for the first valve, brought into press-fit engagement with the valve seat 15 to be thereby integrated therewith.

Otherwise, this embodiment is of the same construction as Embodiment 1.

In the electromagnetic valve of this embodiment, in contrast to that of Embodiment 1, the sleeve 31 in which the shut-off valve 16 slides is a separate component from the valve seat 15, with the result that both the components are simplified in configuration and improved in workability.

The sleeve 31 and the valve seat 15 may be integrated with each other by welding.

While the above-described embodiments are applied to a normally-low type electromagnetic valve, which is a three-way type proportional electromagnetic valve to be used for hydraulic control in an automatic transmission, they are also applicable to a normally-high type electromagnetic valve, in which the operating direction of the plunger upon energization is reversed.

Further, the present invention is also applicable to a so-called electromagnetic valve with a flow rate switching function.

What is claimed is:

1. An electromagnetic valve comprising:
   a housing having an inflow hole through which a fluid flows in and a discharge hole through which the fluid is discharged to an exterior;
   a valve seat secured in position inside the housing (10);
   a first valve adapted to come into contact with one surface of the valve seat to shut off the fluid flowing into the housing through the inflow hole;
   a second valve provided coaxially with an axis of the first valve and adapted to control an amount of the fluid flowing to the exterior of the housing through the discharge hole by adjusting a dimension of a gap between the second valve and the other surface of the valve seat;
   a first valve guide portion fixed to the housing and adapted to guide the first valve in the direction of the axis; and
   a second valve guide portion adapted to guide the second valve in the direction of the axis,
   wherein the valve seat is integrated with the first valve guide portion and fixed to the second valve guide portion.

2. An electromagnetic valve according to claim 1, wherein the first valve guide portion and the second valve guide portion are each brought into press-fit engagement with the valve seat for fixation.

3. An electromagnetic valve according to claim 1, further comprising a first seal member and a second seal member for preventing the fluid from the inflow hole from leaking to the exterior along the inner wall surface of the housing, the first seal member and the second seal member being provided, with the inflow hole therebetween, between the valve seat and the housing, and between the first valve guide portion and the housing, respectively.

4. An electromagnetic valve according to claim 3, wherein the first seal member comprises an O-ring formed of an elastic rubber material, and wherein the second seal member provided between an end surface of the first valve guide portion and the housing comprises a metal ring.

5. An electromagnetic valve according to claim 4, wherein the metal ring is formed of a deflected thin plate.

* * * * *